United States Patent
Assmann et al.

(10) Patent No.: US 9,926,233 B2
(45) Date of Patent: Mar. 27, 2018

(54) CONSTRUCTION CHEMICAL COMPOSITION FOR TILE MORTAR

(71) Applicant: BASF SE, Ludwigshafen (DE)

(72) Inventors: Alexander Assmann, Seeon (DE); Christian Biro, Kirchanschoering (DE); Christoph Hesse, Ebersberg (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 15/529,329

(22) PCT Filed: Dec. 17, 2015

(86) PCT No.: PCT/EP2015/080285
§ 371 (c)(1),
(2) Date: May 24, 2017

(87) PCT Pub. No.: WO2016/097181
PCT Pub. Date: Jun. 23, 2016

(65) Prior Publication Data
US 2017/0275204 A1    Sep. 28, 2017

(30) Foreign Application Priority Data
Dec. 18, 2014  (EP) .................................... 14198721

(51) Int. Cl.
| | |
|---|---|
| *C04B 28/04* | (2006.01) |
| *C04B 14/06* | (2006.01) |
| *C04B 24/38* | (2006.01) |
| *C04B 14/04* | (2006.01) |
| *C04B 103/46* | (2006.01) |
| *C04B 103/14* | (2006.01) |
| *C04B 111/00* | (2006.01) |
| *C04B 111/70* | (2006.01) |

(52) U.S. Cl.
CPC ............ *C04B 28/04* (2013.01); *C04B 14/043* (2013.01); *C04B 14/06* (2013.01); *C04B 24/383* (2013.01); *C04B 2103/14* (2013.01); *C04B 2103/46* (2013.01); *C04B 2111/00672* (2013.01); *C04B 2111/70* (2013.01)

(58) Field of Classification Search
CPC ....... C04B 28/04; C04B 14/043; C04B 14/06; C04B 24/383; C04B 2103/14; C04B 2103/46; C04B 2111/00672; C04B 2111/70
USPC ........................................................... 524/5
See application file for complete search history.

(56) References Cited

U.S. PATENT DOCUMENTS

| | | |
|---|---|---|
| 5,332,041 A | 7/1994 | Onan et al. |
| 5,355,954 A | 10/1994 | Onan et al. |
| 5,360,841 A | 11/1994 | Knop et al. |
| 5,413,634 A | 5/1995 | Shawl et al. |
| 5,609,680 A | 3/1997 | Kobayashi et al. |
| 5,709,743 A | 1/1998 | Leture et al. |
| 5,750,634 A | 5/1998 | Albrecht et al. |
| 5,925,184 A | 7/1999 | Hirata et al. |
| 6,170,574 B1 | 1/2001 | Jones |
| 6,832,652 B1 | 12/2004 | Dillenbeck et al. |
| 6,855,752 B2 | 2/2005 | Velten et al. |
| 7,041,167 B2 | 5/2006 | Jiang |
| 7,258,736 B2 | 8/2007 | Oriakhi et al. |
| 7,605,196 B2 | 10/2009 | Schinabeck et al. |
| 7,641,731 B2 | 1/2010 | Chanut et al. |
| 7,772,300 B2 | 8/2010 | Schinabeck et al. |
| 8,349,960 B2 | 1/2013 | Gaeberlein et al. |
| 8,436,072 B2 | 5/2013 | Herth et al. |
| 2002/0129743 A1 | 9/2002 | Frailey et al. |
| 2002/0166479 A1 | 11/2002 | Jiang |
| 2003/0022987 A1 | 1/2003 | Matz et al. |
| 2004/0024154 A1 | 2/2004 | Schinabeck et al. |
| 2004/0261664 A1 | 12/2004 | Oriakhi et al. |
| 2007/0032550 A1 | 2/2007 | Lewis et al. |
| 2007/0163470 A1 | 7/2007 | Chanut et al. |
| 2008/0078814 A1 | 4/2008 | Koyanagi et al. |
| 2008/0108732 A1 | 5/2008 | Wieland et al. |
| 2008/0200590 A1 | 8/2008 | Schinabeck et al. |
| 2008/0319217 A1 | 12/2008 | Ingrisch et al. |
| 2009/0054558 A1 | 2/2009 | Wieland et al. |
| 2009/0186964 A1 | 7/2009 | Schinabeck et al. |
| 2009/0229492 A1 | 9/2009 | Mills |
| 2010/0190888 A1 | 7/2010 | Gaeberlein et al. |
| 2011/0015301 A1 | 1/2011 | Herth et al. |
| 2011/0095227 A1 | 4/2011 | Herth et al. |
| 2011/0104377 A1* | 5/2011 | Zapf ..................... C04B 20/023 427/385.5 |
| 2011/0160393 A1 | 6/2011 | Sakamoto et al. |
| 2011/0269875 A1 | 11/2011 | Nicoleau et al. |
| 2012/0196046 A1 | 8/2012 | Nicoleau et al. |
| 2012/0216724 A1 | 8/2012 | Nicoleau et al. |
| 2012/0220696 A1 | 8/2012 | Nicoleau et al. |
| 2012/0270969 A1 | 10/2012 | Bichler et al. |
| 2012/0270970 A1 | 10/2012 | Bichler et al. |
| 2013/0035423 A1 | 2/2013 | Sabio et al. |
| 2013/0118381 A1 | 5/2013 | Frenkenberger et al. |
| 2014/0066546 A1 | 3/2014 | Langlotz et al. |
| 2015/0344368 A1 | 12/2015 | Hesse et al. |

FOREIGN PATENT DOCUMENTS

| | | |
|---|---|---|
| CA | 2071051 | 12/1992 |
| CA | 2172004 | 9/1996 |

(Continued)

OTHER PUBLICATIONS

PCT/EP2015/080285—International Search Report, dated Feb. 22, 2016.

(Continued)

*Primary Examiner* — Angela C Scott
(74) *Attorney, Agent, or Firm* — Curatola Sidoti Co., LPA; Joseph G. Curatolo; Salvatore A. Sidoti

(57) ABSTRACT

The present invention relates to a construction chemical composition comprising Portland cement, a water retention agent, a dispersing agent, and a hardening accelerator comprising calcium-silicate-hydrate, as well as a mortar composition containing said construction chemical composition. Although the composition is based on Portland cement it has a pull-off strength after 6 h meeting the DIN requirements and can therefore be used as a fast setting tile mortar.

16 Claims, No Drawings

(56) References Cited

FOREIGN PATENT DOCUMENTS

| | | |
|---|---|---|
| DE | 35 27 981 A1 | 2/1987 |
| DE | 0 403 974 A1 | 12/1990 |
| DE | 43 42 407 A1 | 6/1995 |
| DE | 4411797 A1 | 10/1995 |
| DE | 197 24 700 A1 | 12/1998 |
| DE | 1103 51 259 A1 | 6/2005 |
| DE | 102004050395 A1 | 4/2006 |
| DE | 10 2005 001 101 A1 | 7/2006 |
| DE | 20 2006 016 797 U1 | 12/2006 |
| DE | 10 2005 051 375 A1 | 5/2007 |
| DE | 10 2006 041 552 A1 | 3/2008 |
| DE | 10 2007 027 470 A1 | 12/2008 |
| EP | 0 518 156 A2 | 12/1992 |
| EP | 0 605 257 A1 | 7/1994 |
| EP | 0 637 574 A1 | 2/1995 |
| EP | 1 491 516 A2 | 12/2004 |
| EP | 1 655 272 A1 | 5/2006 |
| EP | 1 897 927 A2 | 3/2008 |
| EP | 2 325 231 A1 | 5/2011 |
| EP | 2 695 866 A2 | 2/2014 |
| JP | H 01-224253 A | 9/1989 |
| JP | 2000/095554 A | 4/2000 |
| JP | 2001/058863 A | 3/2001 |
| JP | 2003-292357 A | 10/2003 |
| JP | 2007-238359 A | 9/2007 |
| JP | 2008127247 | 6/2008 |
| WO | WO 01/05365 A1 | 1/2001 |
| WO | WO 02/070425 A1 | 9/2002 |
| WO | WO 2005/077857 A2 | 8/2005 |
| WO | WO 2005/090424 A1 | 9/2005 |
| WO | WO 2006/002936 A1 | 1/2006 |
| WO | WO 2006/138277 A2 | 12/2006 |
| WO | WO 2007/071361 A1 | 6/2007 |
| WO | WO 2008/0145975 A1 | 12/2008 |
| WO | WO 2010/026155 A1 | 3/2010 |
| WO | WO 2011/006837 A1 | 1/2011 |
| WO | WO 2011/026825 A2 | 3/2011 |
| WO | WO 2011/131904 A1 | 10/2011 |
| WO | WO 2012/072466 A1 | 6/2012 |
| WO | WO 2012/143206 A1 | 10/2012 |
| WO | WO 2013/134208 A1 | 9/2013 |
| WO | WO 2014/114782 A1 | 7/2014 |
| WO | WO 2014/114784 A1 | 7/2014 |

OTHER PUBLICATIONS

PCT/EP2015/080285—International Written Opinion, dated Feb. 22, 2016.

Cölfen, Helmut; "Analytical Ultracentrifugation of Nanoparticles"; Polymer News; 2004; vol. 29; p. 101-116; Taylor & Francis; Abstract.

Saito, Fumio, et al.; "Mechanochemical Synthesis of Hydrated Calcium Silicates By Room Temperature Grinding"; Solid State Ionics; 1997; pp. 37-43; Elsevier.

"Silica", Ullmann's Encyclopedia of Industrial Chemistry, 2002, Wiley-VCH Verlag GmbH & CO. KGaA, Abstract.

Matsuyama, et al. "Intercalation of Polymers in Calcium Silicate Hydrate: A New Synthetic Approach to Biocomposites", Chem. Mater., 1999, 11, 16-19.

Matsuyama, et al. "Synthesis of calcium silicate hydrate/polymer complexes: Part II. Cationic polymers and complex formation with different polymers", J. Mater. Res., vol. 14, No. 6, Aug. 1999.

Matsuyama, et al. "Synthesis of calcium silicate hydrate/polymer complexes: Part I. Anionic and nonionic polymers", J. Mater. Res., vol. 14, No. 8, Aug. 1999.

Franceschini, et al., "New covalent bonded polymer-calcium silicate hydrate composites", J. Mater. Chem., 2007, 17, 913-922.

Matsuyama, et al., "The Formation of C-S-H/polymer complexes with superplasticizing polymers", Concrete Science and Engineering, pp. 148-156, vol. 1, Sep. 1999, RILEM Publications S.A.R.L.

Markus Arnold Dissertation, "Polymer-Controlled Crystallization of Calcium Hydroxide and Calcium Silicate Hydrate", University of Siegen, pp. 1-180, 2004. ((English language translation of pertinent sections (pp. 113-157, 167-168 and 177-178) are provided)).

Badger, et al., "Increased Durability Through Nano-Scale Seeding in Portland Cement", Transportation Research Board (TRB) 2003 Annual Meeting, Jul. 31, 2002.

O. Hetche, "Effects of synthetic calcium-silicate-hydrate on the bonding of portland cement", Anniversary of the specialist group of bauchemie, Oct. 5 and 6, 2006, karlsruhe GDCh-monographieband 35, 255-262 (translation of Abstract.).

Liao et al., "Effects of a carboxylic acid/sulfonic acid copolymer on the material properties of cementitious materials", Concrete Research 36 (2006) 650-655.

* cited by examiner

CONSTRUCTION CHEMICAL COMPOSITION FOR TILE MORTAR

CROSS REFERENCE TO RELATED APPLICATIONS

This application is a national stage application of International Application No. PCT/EP2015/080285, filed 17 Dec. 2015, which claims priority from European Patent Application No. 14198721.4, filed 18 Dec. 2014, which applications are incorporated herein by reference.

The present invention relates to a construction chemical composition comprising Portland cement, a water retention agent, a redispersable polymer powder, and a hardening accelerator comprising calcium-silicate-hydrate, as well as a mortar composition containing said construction chemical composition.

State of the art formulations for fast setting tile mortars generally contain Portland cement and a high amount of fast hardening cement, such as calcium aluminate cement as hydraulic binder, and retarders, such as tartaric acid and citric acid, to achieve workability properties, see for example the formulations disclosed in WO 2010/026155. The use of said components is very expensive and the quality of a formulation of calcium aluminate cement in combination with Portland cement is highly depending on the quality of Portland cement.

In addition to that, state of the art compositions containing a fast hardening cement, such as fast setting tile mortars, suffer from stability problems and deterioration of hardened mortar caused by wet immersion and exposure to freezing and thawing. Moreover, the presence of a fast hardening cement, for example calcium aluminate, requires the use of additional additives such as retarders like citric acid or gluconic acid and accelerators like lithium carbonate. On the other hand, cementitious adhesives without fast hardening cement, for example those containing only Portland cement, exhibit unsatisfying early age mechanical properties, such as insufficient pull-off strength after 6 hours, even though the adhesives contain a high amount of hardening accelerators. This means that state of the art formulations without fast hardening cement exhibit reduced mechanical properties. For example, in general they do not meet the pull-off strength values of at least 0.5 MPa after 6 hours as required by industrial norm DIN EN 12004 and DIN EN 1348:2007-11 for fast setting cementitious tile adhesives ("F" classification).

The problem underlying the invention is therefore to provide a construction chemical composition, in particular for tile mortar, or a mortar composition containing said construction chemical composition containing an at least reduced amount of fast hardening cement without impairing the mechanical properties of the mortar such as stability of the mortar against deterioration caused by wet immersion and freeze-thaw storage. Further, it is a problem of the invention to provide a construction chemical composition containing an at least reduced amount of fast hardening cement for use in a tile mortar composition meeting the requirement of a pull-off strength value of at least 0.5 MPa after 6 h sufficient for the classification as fast setting mortar.

Further, the construction chemical composition should be in the form of a simple formulation meeting said requirement, with sufficient robustness against varying qualities of Portland cement.

These problems are solved by a construction chemical composition, in particular for tile mortar, with the following embodiments:

1. A construction chemical composition comprising
   a) 10 to 60% by weight, based on the total weight of the construction chemical composition, of Portland cement;
   b) 0.01 to 3% by weight, based on the total weight of the construction chemical composition, of a water retention agent selected from at least one cellulose ether;
   c) 0.1 to 10% by weight, based on the total weight of the construction chemical composition, of a redispersable polymer powder selected from at least one latex powder with a molecular weight of at least 500,000 g/mol; and
   d) 0.2 to 3% by weight, based on the total weight of the construction chemical composition, of a hardening accelerator comprising calcium-silicate-hydrate; and
   e) sand.

2. Construction chemical composition according to embodiment 1, wherein the hardening accelerator comprises calcium-silicate-hydrate and at least one calcium salt having a solubility in water of ≥1 g/l at 23° C.

3. Construction chemical composition according to embodiment 2, wherein the calcium salt is selected from the group consisting of calcium chloride, calcium nitrate, calcium formate, calcium acetate, calcium bicarbonate, calcium bromide, calcium citrate, calcium chlorate, calcium gluconate, calcium hydroxide, calcium oxide, calcium hypochlorite, calcium iodate, calcium iodide, calcium lactate, calcium nitrite, calcium propionate, calcium sulfate, calcium sulfate hemihydrate, calcium sulfate dihydrate, and mixtures of two or more of these salts.

4. Construction chemical composition according to embodiment 3, wherein the calcium salt is selected from calcium nitrate, calcium acetate, calcium chloride, calcium hydroxide or calcium formate, or a mixture of two or more of these salts.

5. Construction chemical composition according to any one of the preceding embodiments, wherein the calcium-silicate-hydrate (CSH) is selected from low-density CSH, CSH gel, CSH seeds or preferably CSH obtainable by the reaction of a water-soluble calcium compound with a water-soluble silicate compound in presence of a water-soluble dispersant.

6. Construction chemical composition according to embodiments 5, wherein the water-soluble silicate compound is selected from lithium silicate, sodium silicate, potassium silicate, waterglass, aluminum silicate, ammonium silicate, silicic acid, sodium metasilicate, potassium metasilicate, and mixtures of two or more of these components.

7. Construction chemical composition according to embodiment 5 or 6, wherein the water-soluble silicate compound is selected from an alkali metal silicate according to formula m $SiO_2 \cdot n\, M_2O$, wherein M is Li, Na, K, or $NH_4$, preferably Na or K, or mixtures thereof, m and n are molar numbers, and the ratio m:n is from about 0.9 to about 4, preferably about 0.9 to about 3.8, and more particularly about 0.9 to about 3.6.

8. Construction chemical composition according to any one of embodiments 5 to 7, wherein the water-soluble dispersant comprises at least one polymer obtained by polymerizing at least one monomer containing at least one anionic or anionogenic group and at least one monomer comprising at least one polyether side chain.

9. Construction chemical composition according to embodiment 8, wherein the polymer as anionic or anionogenic group contains at least one structural unit of the general formulae (Ia), (Ib), (Ic) and/or (Id):

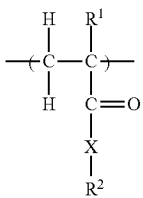

(Ia)

wherein
$R^1$ is H or a linear or branched $C_1$-$C_4$ alkyl group, $CH_2COOH$, or $CH_2CO$—X—$R^2$;
X is NH—$(C_nH_{2n})$ or O—$(C_nH_{2n})$ with n=1, 2, 3, or 4, or is a chemical bond, the nitrogen atom or oxygen atom, respectively, being bonded to the CO group;
$R^2$ is OM, $PO_3M_2$, or O—$PO_3M_2$; with the proviso that X is a chemical bond, in case $R^2$ is OM;

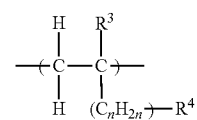

(Ib)

wherein
$R^3$ is H or a linear or branched $C_1$-$C_4$ alkyl group;
n is 0, 1, 2, 3, or 4;
$R^4$ is $PO_3M_2$, or O—$PO_3M_2$;

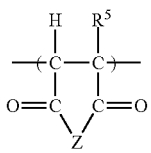

(Ic)

wherein
$R^5$ is H or a linear or branched $C_1$-$C_4$ alkyl group;
Z is O or $NR^7$; and
$R^7$ is H, $(C_nH_{2n})$—OH, $(C_nH_{2n})$—$PO_3M_2$, $(C_nH_{2n})$—$OPO_3M_2$, $(C_6H_4)$—$PO_3M_2$, or $(C_6H_4)$—$OPO_3M_2$;
n is 1, 2, 3, or 4;

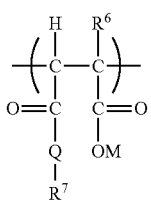

(Id)

wherein
$R^6$ is H or a linear or branched $C_1$-$C_4$ alkyl group;
Q is $NR^7$ or O;
$R^7$ is H, $(C_nH_{2n})$—OH, $(C_nH_{2n})$—$PO_3M_2$, $(C_nH_{2n})$—$OPO_3M_2$, $(C_6H_4)$—$PO_3M_2$, $(C_6H_4)$—$OPO_3M_2$ or $(C_nH_{2n})$—O-$(AO)_a$—$R^9$;
n is 1, 2, 3, or 4; and
a is an integer from 1 to 350, preferably 5 to 150;

each M in the formulae mentioned above independently of any other is H or one cation equivalent.

10. Construction chemical composition according to embodiment 9, wherein the polymer as anionic or anionogenic group contains at least one structural unit according to formula (Ia), wherein $R^1$ is H or $CH_3$; and/or at least one structural unit according to formula (Ib), wherein $R^3$ is H or $CH_3$; and/or at least one structural unit according to formula (Ic) wherein $R^5$ is H or $CH_3$ and Z is O; and/or at least one structural unit according to formula (Id), wherein $R^6$ is H and Q is O.

11. Construction chemical composition according to embodiment 9 or 10, wherein the polymeric dispersant as anionic or anionogenic group contains at least one structural unit according to formula (Ia), wherein $R^1$ is H or $CH_3$ and $XR^2$ is OM or X is $O(C_nH_{2n})$ with n=1, 2, 3, or 4, more particularly 2, and $R^2$ is O—$PO_3M_2$.

12. Construction chemical composition according to any of the embodiments 8 to 11, wherein the polymer as polyether side chain contains at least one structural unit of the general formulae (IIa), (IIb), (IIc) and/or (IIId):

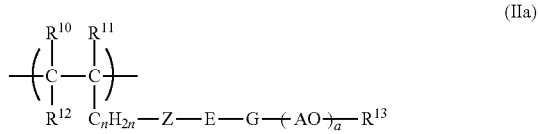

(IIa)

wherein
$R^{10}$, $R^{11}$, and $R^{12}$ independently of one another are H or a linear or branched $C_1$-$C_4$ alkyl group;
Z is O or S;
E is a linear or branched $C_1$-$C_6$ alkylene group, a cyclohexylene group, $CH_2$—$C_6H_{10}$, 1,2-phenylene, 1,3-phenylene, or 1,4-phenylene;
G is O, NH, or CO—NH; or
E and G together are a chemical bond;
A is $C_xH_{2x}$ with x=2, 3, 4, or 5, or $CH_2CH(C_6H_5)$;
n is 0, 1, 2, 3, 4, and/or 5;
a is an integer from 2 to 350;
$R^{13}$ is H, a linear or branched $C_1$-$C_4$ alkyl group, CO—$NH_2$ and/or $COCH_3$;

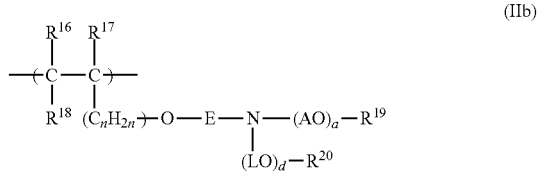

(IIb)

wherein
$R^{16}$, $R^{17}$, and $R^{18}$ independently of one another are H or a linear or branched $C_1$-$C_4$ alkyl group;
E is a linear or branched $C_1$-$C_6$ alkylene group, a cyclohexylene group, $CH_2$—$C_6H_{10}$, 1,2-phenylene, 1,3-phenylene, or 1,4-phenylene, or a chemical bond;
A is $C_xH_{2x}$ with x=2, 3, 4, or 5, or $CH_2CH(C_6H_5)$;
L is $C_xH_{2x}$ with x=2, 3, 4, or 5, or $CH_2$—$CH(C_6H_5)$;
a is an integer from 2 to 350;
d is an integer from 1 to 350;
$R^{19}$ is H or a linear or branched $C_1$-$C_4$ alkyl group;
$R^{20}$ is H or a linear or branched $C_1$-$C_4$ alkyl group; and
n is 0, 1, 2, 3, 4, or 5;

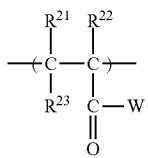

wherein
$R^{21}$, $R^{22}$ and $R^{23}$ independently of one another are H or a linear or branched $C_1$-$C_4$ alkyl group;
W is O, $NR^{25}$, or N;
Y is 1 if W=O or $NR^{25}$, and is 2 if W=N;
A is $C_xH_{2x}$ with x=2, 3, 4, or 5, or $CH_2CH(C_6H_5)$;
a is an integer from 2 to 350;
$R^{24}$ is H or a linear or branched $C_1$-$C_4$ alkyl group;
$R^{25}$ is H or a linear or branched $C_1$-$C_4$ alkyl group;

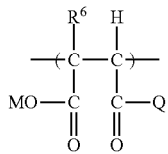

wherein
$R^6$ is H or a linear or branched $C_1$-$C_4$ alkyl group;
Q is $NR^{10}$, N, or O;
Y is 1 if Q=O or $NR^{10}$, and is 2 if Q=N;
$R^{10}$ is H or a linear or branched $C_1$-$C_4$ alkyl group;
$R^{24}$ is H or a linear or branched $C_1$-$C_4$ alkyl group;
A is $C_xH_{2x}$ with x=2, 3, 4, or 5, or $CH_2C(C_6H_5)H$; and
a is an integer from 2 to 350.

13. Construction chemical composition according to embodiment 12, wherein the polymeric dispersant contains as a polyether side chain:
(a) at least one structural unit according to formula (IIa), wherein $R^{10}$ and $R^{12}$ are H, $R^{11}$ is H or $CH_3$, E and G together are a chemical bond, A is $C_xH_{2x}$ with x=2 and/or 3, a is 3 to 150, and $R^{13}$ is H or a linear or branched $C_1$-$C_4$ alkyl group; and/or
(b) at least one structural unit according to formula (IIb), wherein $R^{16}$ and $R^{18}$ are H, $R^{17}$ is H or $CH_3$, E is a linear or branched $C_1$-$C_6$ alkylene group, A is $C_xH_{2x}$ with x=2 and/or 3, L is $C_xH_{2x}$ with x=2 and/or 3, a is an integer from 2 to 150, d is an integer from 1 to 150, $R^{19}$ is H or a linear or branched $C_1$-$C_4$ alkyl group, and $R^{20}$ is H or a linear or branched $C_1$-$C_4$ alkyl group; and/or
(c) at least one structural unit according to formula (IIc), wherein $R^{21}$ and $R^{23}$ are H, $R^{22}$ is H or $CH_3$, A is $C_xH_{2x}$ with x=2 and/or 3, a is an integer from 2 to 150, and $R^{24}$ is H or a linear or branched $C_1$-$C_4$ alkyl group; and/or
(d) at least one structural unit according to formula (IIId), wherein $R^6$ is H, Q is O, $R^7$ is $(C_nH_{2n})$—O-$(AO)_a$—$R^9$, n is 2 and/or 3, A is $C_xH_{2x}$ with x=2 and/or 3, a is an integer from 1 to 150, and $R^9$ is H or a linear or branched $C_1$-$C_4$ alkyl group.

14. Construction chemical composition according to embodiment 12 or 13, wherein the polymeric dispersant comprises at least one structural unit according to formula (IIa) and/or (IIc).

15. Construction chemical composition according to embodiment 8, wherein the water-soluble dispersant is a polycondensate comprising at least one aromatic or heteroaromatic structural unit containing a polyether side chain, and at least one aromatic or heteroaromatic structural unit containing at least one phosphoric ester group or a salt thereof.

16. Construction chemical composition according to embodiment 15, wherein the dispersant comprises at least one polymer, which is a polycondensation product comprising structural units (III) and (IV):

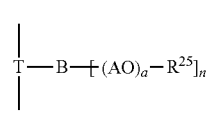

wherein
T is a substituted or unsubstituted phenyl or substituted or unsubstituted naphthyl radical or a substituted or unsubstituted heteroaromatic radical containing 5 to 10 ring atoms, of which 1 or 2 atoms are heteroatoms selected from the group N, O, and S;
n is 1 or 2;
B is N, NH, or O, with the proviso that n is 2, in the case B is N and with the proviso that n is 1, in the case B is NH or O;
A is $C_xH_{2x}$ with x=2, 3, 4, or 5, or $CH_2CH(C_6H_5)$;
a is an integer from 1 to 300;
$R^{25}$ is H, a branched or linear $C_1$ to $C_{10}$ alkyl radical, $C_5$ to $C_8$ cycloalkyl radical, aryl radical, or heteroaryl radical containing 5 to 10 ring atoms, of which 1 or 2 atoms are heteroatoms selected from the group N, O, and S;
wherein the structural unit (IV) is selected from structural units (IVa) and (IVb):

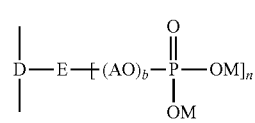

wherein
D is a substituted or unsubstituted phenyl or substituted or unsubstituted naphthyl radical or a substituted or unsubstituted heteroaromatic radical containing 5 to 10 ring atoms, of which 1 or 2 atoms are heteroatoms selected from the group N, O, and S;
E is N, NH, or O, with the proviso that m is 2, in the case E is N and with the proviso that m is 1, in the case E is NH or O;
A is $C_xH_{2x}$ with x=2, 3, 4, or 5, or $CH_2CH(C_6H_5)$;
b is an integer from 1 to 300;
M independently at each occurrence is H or one cation equivalent;

wherein
V is a substituted or unsubstituted phenyl or substituted or unsubstituted naphthyl radical and is optionally substituted by 1 or two radicals selected from the group $R^8$, OH, OR⁸, (CO)R⁸, COOM, COOR⁸, SO₃R⁸, and NO₂, preferably OH, OC₁-C₄ alkyl and C₁-C₄ alkyl;

$R^7$ is COOM, OCH₂COOM, SO₃M, or OPO₃M₂;

M is H or one cation equivalent; and $R^8$ is C₁-C₄ alkyl, phenyl, naphthyl, phenyl-C₁-C₄ alkyl, or C₁-C₄ alkylphenyl.

17. Construction chemical composition according to embodiment 16, wherein T is a substituted or unsubstituted phenyl radical or substituted or unsubstituted naphthyl radical, E is NH or OH, A is $C_xH_{2x}$ with x=2 and/or 3, a is an integer from 1 to 150, and $R^{25}$ is H or a branched or linear C to $C_{10}$ alkyl radical.

18. Construction chemical composition according to embodiment 16, wherein D is a substituted or unsubstituted phenyl radical or substituted or unsubstituted naphthyl radical, E is NH or O, A is $C_xH_{2x}$ with x=2 and/or 3, and b is an integer from 1 to 150.

19. Construction chemical composition according to embodiments 16 to 18, wherein T and/or D are phenyl or naphthyl, substituted by 1 or 2 C₁-C₄ alkyl, hydroxy or 2 C₁-C₄ alkoxy groups.

20. Construction chemical composition according to embodiment 16, wherein V is phenyl or naphthyl substituted by 1 or 2 C₁-C₄ alkyl, OH, OCH₃, or COOM, and $R^7$ is COOM or OCH₂COOM.

21. Construction chemical composition according to embodiments 16 to 20, wherein the polycondensation product comprises a further structural unit (V) according to formula

(V)

wherein $R^5$ and $R^6$ may be identical or different and are H, CH₃, COOH, or a substituted or unsubstituted phenyl or substituted or unsubstituted naphthyl group, or a substituted or unsubstituted heteroaromatic group containing 5 to 10 ring atoms, of which 1 or 2 atoms are heteroatoms selected from the group N, O, and S.

22. Construction chemical composition according to embodiment 21, wherein $R^5$ and $R^6$ may be identical or different and are H, CH₃, or COOH, more particularly H, or one of the radicals $R^5$ and $R^6$ is H and the other is CH₃.

23. Construction chemical composition according to embodiments 8 to 14, wherein the polymeric dispersant contains units according to formulae (I) and (II), more particularly according to formulae (Ia) and (IIa).

24. Construction chemical composition according to embodiment 23, wherein the polymeric dispersant contains structural units according to formulae (Ia) and (IIc).

25. Construction chemical composition according to embodiment 23, wherein the polymeric dispersant contains structural units according to formulae (Ic) and (IIa).

26. Construction chemical composition according to embodiment 23, wherein the polymeric dispersant contains structural units according to formulae (Ia), (Ic), and (IIa).

27. Construction chemical composition according to embodiment 8 to 14 or 23 to 26, wherein the polymeric dispersant is composed of (i) anionic or anionogenic structural units derived from acrylic acid, methacrylic acid, maleic acid, hydroxyethyl acrylate phosphoric esters, and/or hydroxyethyl methacrylate phosphoric esters, hydroxyethyl acrylate phosphoric diesters, and/or hydroxyethyl methacrylate phosphoric diesters, and (ii) polyether side chain structural units derived from C₁-C₄ alkyl-polyethylene glycol acrylic esters, polyethylene glycol acrylic esters, C₁-C₄ alkyl-polyethylene glycol methacrylic esters, polyethylene glycol methacrylic esters, C₁-C₄ alkyl-polyethylene glycol acrylic esters, polyethylene glycol acrylic esters, vinyloxy-C₂-C₄ alkylene-polyethylene glycol, vinyloxy-C₂-C₄ alkylene-polyethylene glycol C₁-C₄ alkyl ethers, allyloxy-polyethylene glycol, allyloxy-polyethylene glycol C₁-C₄ alkyl ethers, methallyloxy-polyethylene glycol, methallyloxy-polyethylene glycol C₁-C₄ alkyl ethers, isoprenyloxy-polyethylene glycol and/or isoprenyloxy-polyethylene glycol C₁-C₄ alkyl ethers.

28. Construction chemical composition according to embodiment 27, wherein the polymeric dispersant is composed of structural units (i) and (ii) derived from
   (i) hydroxyethyl acrylate phosphoric esters and/or hydroxyethyl methacrylate phosphoric esters and (ii) C₁-C₄ alkyl-polyethylene glycol acrylic esters and/or C₁-C₄ alkyl-polyethylene glycol methacrylic esters; or
   (i) acrylic acid and/or methacrylic acid and (ii) C₁-C₄ alkyl-polyethylene glycol acrylic esters and/or C₁-C₄ alkyl-polyethylene glycol methacrylic esters; or
   (i) acrylic acid, methacrylic acid and/or maleic acid and (ii) vinyloxy-C₂-C₄ alkylene-polyethylene glycol, allyloxy-polyethylene glycol, methallyloxy-polyethylene glycol and/or isoprenyloxy-polyethylene glycol.

29. Construction chemical composition according to embodiment 28, wherein the polymeric dispersant is composed of structural units (i) and (ii) derived from
   (i) hydroxyethyl methacrylate phosphoric esters and (ii) C₁-C₄ alkyl-polyethylene glycol methacrylic esters or polyethylene glycol methacrylic esters; or
   (i) methacrylic acid and (ii) C₁-C₄ alkyl-polyethylene glycol methacrylic esters or polyethylene glycol methacrylic esters; or
   (i) acrylic acid and maleic acid and (ii) vinyloxy-C₂-C₄ alkylene-polyethylene glycol or
   (i) acrylic acid and maleic acid and (ii) isoprenyloxy-polyethylene glycol or
   (i) acrylic acid and (ii) vinyloxy-C₂-C₄ alkylene-polyethylene glycol or
   (i) acrylic acid and (ii) isoprenyloxy-polyethylene glycol or
   (i) acrylic acid and (ii) methallyloxy-polyethylene glycol or
   (i) maleic acid and (ii) isoprenyloxy-polyethylene glycol or
   (i) maleic acid and (ii) allyloxy-polyethylene glycol or
   (i) maleic acid and (ii) methallyloxy-polyethylene glycol.

30. Construction chemical composition according to the embodiments 8 to 14, wherein the molar ratio of structural units (I):(II) is 1:4 to 15:1, more particularly 1:1 to 10:1.

31. Construction chemical composition according to any of the embodiments 16 to 22, wherein the molar ratio of structural units (III):(IV) is 4:1 to 1:15, more particularly 2:1 to 1:10.

32. Construction chemical composition according to any of the embodiments 16 to 22, wherein the molar ratio of structural units (III+IV):(V) is 2:1 to 1:3, more particularly 1:0.8 to 1:2.

33. Construction chemical composition according to the embodiments 16 to 22 or 31 to 32, wherein the polymeric dispersant is composed of structural units according to formulae (III) and (IV), wherein T and D are phenyl or naphthyl, optionally substituted by 1 or 2 $C_1$-$C_4$ alkyl, hydroxy or 2 $C_1$-$C_4$ alkoxy groups, B and E are 0, A is $C_xH_{2x}$ with x=2, a is 3 to 150, more particularly 10 to 150, and b is 1, 2, or 3.

34. Construction chemical composition according to any of the embodiments 5 to 33, wherein the molar ratio of calcium to silicon in the calcium-silicate-hydrate particles is 0.6 to 2, preferably 0.8 to 1.8, more preferably 0.9 to 1.6, more particularly preferably 1.0 to 1.5.

35. Construction chemical composition according to any of the embodiments 5 to 34, wherein the molar ratio of calcium to water in the calcium-silicate-hydrate particles is 0.6 to 6, preferably 0.6 to 4, more preferably 0.8 to 2.

36. Construction chemical composition according to any of the preceding embodiments, further comprising formulating auxiliaries selected from defoamers, air entrainers, shrinkage reducers, frost preventatives, antiefflorescence agents, and mixtures of two or more thereof.

37. Construction chemical composition according to any of the preceding embodiments, additionally comprising a fast-hardening cement, preferably selected from calcium aluminate cement and calcium sulphoaluminate cement, in an amount of less than 10% by weight, based on the amount of Portland cement, preferably less than 5% by weight, based on the amount of Portland cement, more preferably less than 1% by weight.

38. Construction chemical composition according to embodiment 37, which is free of fast-hardening cement.

39. Construction chemical composition according to any of the preceding embodiments, additionally comprising an anionic starch ether in an amount of less than 0.5% by weight, preferably less than 0.2% by weight, based on the total amount of the composition.

40. Construction chemical composition according to embodiment 39, which is free of anionic starch ethers.

41. Construction chemical composition according to any of the preceding embodiments, wherein the Portland cement is selected from CEM I and/or CEM II.

42. Construction chemical composition according to any of the preceding embodiments, wherein the cellulose ether is selected from the group consisting of methylcellulose, ethylcellulose, propylcellulose, methylethylcellulose, hydroxyethylcellulose (HEC), hydroxypropylcellulose (HPC), hydroxyethylhydroxypropylcellulose, methylhydroxyethylcelluose (MHEC), methylhydroxypropylcellulose (MHPC) and propylhydroxypropylcellulose or mixtures of two or more thereof.

43. Construction chemical composition according to embodiment 42, wherein the cellulose ether is selected from the group consisting of carboxymethyl cellulose, methyl cellulose, methyl hydroxypropyl cellulose, methyl hydroxyethyl cellulose or mixtures of two or more thereof.

44. Construction chemical composition according to any of the preceding embodiments, wherein latex powder is selected from the group consisting of vinyl acetate polymer, vinyl acetate-ethylene copolymer, vinyl acetate-vinyl ester copolymer and/or vinyl acetate-vinyl ester-ethylene copolymer, with the vinyl ester monomers in each case being selected from the group consisting of vinyl laurate, vinyl pivalate and vinyl versatates, vinyl acetate-acrylic ester copolymer, vinyl acetate-acrylic ester-ethylene copolymer, styrene-butadiene copolymer and styrene-acrylic ester copolymer, with the acrylic esters in each case being esters with branched or linear alcohols containing from 1 to 10 carbon atoms.

45. Construction chemical composition according to embodiment 44, wherein latex powder is selected from the group comprising styrene acrylate copolymer, polyvinyl acetate, styrene butadiene copolymer or mixtures of two or more thereof.

46. Construction chemical composition according to any of the preceding embodiments, wherein the amount of Portland cement is in a range of from 15 to 55% by weight, based on the total weight of the construction chemical composition, preferably 20 to 50% by weight, more preferably 25 to 45% by weight.

47. Construction chemical composition according to any of the preceding embodiments, wherein the amount of cellulose ether is in a range of from 0.05 to 2% by weight, based on the total weight of the construction chemical composition, preferably 0.1 to 1% by weight, more preferably 0.1 to 0.5% by weight.

48. Construction chemical composition according to any of the preceding embodiments, wherein the amount of latex powder is in a range of from 0.5 to 10% by weight, based on the total weight of the composition, preferably 0.5 to 6% by weight, more preferably from 1.0 to 5% by weight.

49. Construction chemical composition according to any of the preceding embodiments, wherein the amount of the hardening accelerator comprising calcium-silicate-hydrate is in a range of from 0.05 to 2% by weight, based on the total weight of the construction chemical composition, preferably 0.1 to 1.5%, more preferably 0.5 to 1%.

50. Construction chemical composition according to any of embodiments 2 to 49, wherein the weight ratio of calcium silicate hydrate to calcium salt having a solubility in water of ≥1 g/l at 23° C. is in the range from 3:1 to 1:3, preferably 2:1 to 1:2.

51. Construction chemical composition according to any of the preceding embodiments containing at least one rheology modifier.

52. Construction chemical composition according to any of the preceding embodiments containing at least one cationic polymer.

53. Construction chemical composition according to embodiment 51, wherein the additional rheology modifier is a water-swellable polymer which can form a hydrogel.

54. Construction chemical composition according to embodiment 53, wherein the water-swellable polymer is selected from the group consisting of
α) anionic crosslinked polyelectrolytes,
β) cationic crosslinked polyelectrolytes,
γ) ampholytic crosslinked polyelectrolytes and/or
δ) nonionic crosslinked polymers, preferably nonionic crosslinked polymers from free-radical polymerization.

55. Construction chemical composition according to embodiment 54, wherein the anionic crosslinked polyelectrolytes comprise sulpho-containing structural units of general formula (VI), preferably in an amount of 5 to 99.99 mol %, more preferably 20 to 80 mol %,

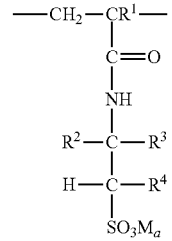
(VI)

wherein
$R^1$ is hydrogen or methyl,
$R^2$, $R^3$, $R^4$ are each the same or different and are each independently hydrogen, an aliphatic branched or unbranched hydrocarbyl radical having 1 to 6 carbon atoms, in particular $C_1$-$C_6$ alkyl, and/or an aromatic hydrocarbyl radical having 6 to 14 carbon atoms, in particular phenyl, M is hydrogen, a mono- or divalent metal cation and/or an ammonium ion, a is ½ and/or 1.

56. Construction chemical composition according to embodiment 54, wherein the cationic crosslinked polyelectrolytes comprise cationic structural units of the general formula (VII), preferably in an amount of 5 to 99.99 mol %, more preferably 20 to 80 mol %,

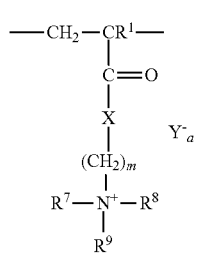

(VII)

wherein $R^1$ is hydrogen or methyl, $R^7$, $R^8$, $R^9$, $R^{10}$ are each the same or different and are each independently hydrogen, a branched or unbranched aliphatic hydrocarbyl radical having 1 to 20 carbon atoms, in particular $C_1$-$C_{20}$ alkyl, a cycloaliphatic hydrocarbyl radical having 5 to 8 carbon atoms, in particular $C_5$-$C_8$ cycloalkyl, and/or an aryl radical having 6 to 14 carbon atoms, in particular phenyl, m is an integer from 1 to 6, X is oxygen and/or N—$R^{10}$, $Y^-_a$ is a halide, $C_1$-$C_4$-alkylsulphate, $C_1$-$C_4$-alkylsulphonate and/or sulphate, a is ½ and/or 1.

57. Construction chemical composition according to embodiment 54, wherein the ampholytic crosslinked polyelectrolytes comprise sulfo-containing structural units of general formula (VI) and cationic structural units of general formula (VII).

58. Construction chemical composition according to embodiments 54 to 57, wherein the anionic crosslinked polyelectrolytes, the cationic crosslinked polyelectrolytes and/or the ampholytic crosslinked polyelectrolytes comprise (meth)acrylamido-containing structural units of general formula (VIII), preferably in an amount of 30 to 94 mol %,

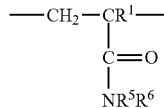

(VIII)

wherein $R^1$ is H or methyl, $R^5$ and $R^6$ are each the same or different and are each independently hydrogen, a branched or unbranched aliphatic hydrocarbyl radical having 1 to 20 carbon atoms, in particular $C_1$-$C_{20}$ alkyl, a cycloaliphatic hydrocarbyl radical having 5 to 8 carbon atoms, in particular $C_5$-$C_8$ cycloalkyl, and/or an aryl radical having 6 to 14 carbon atoms, in particular phenyl.

59. Construction chemical composition according to embodiment 54, wherein the nonionic crosslinked polymers which can form a hydrogel contain (meth)acrylamido-containing structural units of general formula (VIII).

60. Construction chemical composition according to embodiment 52, wherein the cationic polymer comprises 1 to 95 mol % of anionic, sulpho-group-containing structural units according to general formula (IX)

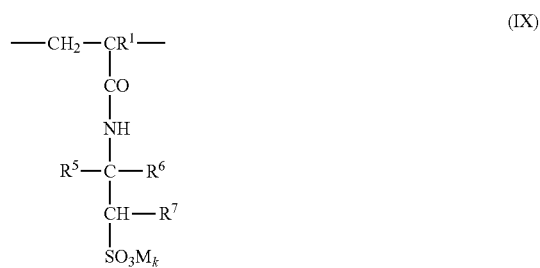

(IX)

$R^1$ is H or methyl, $R^5$ and $R^6$ are each the same or different and are each independently hydrogen, an aliphatic branched or unbranched hydrocarbyl radical having 1 to 6 carbon atoms, in particular $C_1$-$C_6$ alkyl, and/or aromatic hydrocarbyl radical having 6 to 14 carbon atoms, in particular phenyl, $R^7$ is hydrogen, an aliphatic hydrocarbon radical having 1 to 6 C atoms, in particular $C_1$-$C_6$ alkyl, or phenyl radical optionally substituted by methyl groups M is hydrogen, a monovalent or divalent metal cation, an ammonium or an organic amine radical, and k is ½ and/or 1.

61. Construction chemical composition according to embodiment 52, wherein the cationic polymer comprises 10 to 95 mol % of amido-group-containing structural units according to the general formulae (Xa) and/or (Xb)

(Xa)

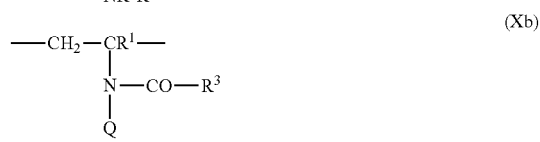

(Xb)

wherein

Q is hydrogen or —$CHR^2R^5$, $R^1$ is H or methyl, $R^2$, $R^3$ and $R^5$ are each the same or different and are each independently hydrogen, an aliphatic branched or unbranched hydrocarbyl radical having 1 to 6 carbon atoms, in particular $C_1$-$C_6$ alkyl, and/or aromatic hydrocarbyl radical having 6 to 14 carbon atoms, in particular phenyl, or, if Q is $CHR^2R^5$, $R^2$ and $R^3$ in general formula (Xb) may together be a —$CH_2$—$(CH_2)_y$— group, so that general formula (Xb) is:

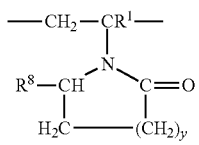

wherein
$R^8$ is a hydrogen atom, a $C_1$- to $C_4$-alkyl radical, a carboxylic acid group and/or a carboxylate group $COOM_k$, wherein y is an integer from 1 to 4, preferably 1 or 2,
M is hydrogen, a monovalent or divalent metal cation, an ammonium or an organic amine radical, and
k is ½ and/or 1.
62. Construction chemical composition according to embodiments 60 and 61, wherein the weight ratio of the cationic polymer to the calcium silicate hydrate is from 5:1 to 1:3, preferably from 2:1 to 1:2.
63. Construction chemical composition according to embodiments 60 to 62, wherein the cationic polymer comprises no crosslinking structural units.
64. Construction chemical composition according to embodiments 60 to 63, wherein the cationic polymers, based on the total molar number of all monomers, comprise less than mol % of carboxylic monomers in copolymerized form.
65. Construction chemical composition according to embodiment 51, wherein the rheology modifier has a BET-surface of from 50 m²/g to 300 m²/g.
66. Construction chemical composition according to embodiment 51 or 65, wherein the rheology modifier is a mineral thickener selected from clay, bentonite, sheet silicates, preferably alumosilicates and/or highly porous calcium-silicate-hydrate.
67. Construction chemical composition according to any of the preceding embodiments, wherein the hardening accelerator provides an acceleration factor of higher than 1.5, preferably higher than 2.0, in particular higher than 2.5, in comparison to a construction chemical composition not containing the hardening accelerator.
68. A mortar composition containing the construction chemical composition of any of the preceding embodiments.
69. The mortar composition according to embodiment 68, wherein the mortar composition provides a pull-off strength value of at least 0.5 MPa according to DIN EN 12004 after 6 h.
70. The use of the mortar composition according to embodiments 68 or 69, as cementitious tile adhesive or grout mortar for floor and/or wall application.

The construction chemical composition of the invention is in particular suitable for tile mortar, preferably fast setting tile mortar, for both floor and wall application as well as a grout mortar.

Portland cement is preferably selected from CEM I and/or CEM II. CEM I contains as the main ingredient Portland cement clinker in an amount of about 95 to 100% by weight of the cement. 5% by weight of the cement or less may be additional ingredients, for example inorganic minerals generated during the clinker production. The main ingredient of CEM II is Portland cement clinker in an amount of from about 65 to about 94% by weight of the cement. CEM II may further contain additional ingredients in an amount of about 6 to about 35% by weight, selected from the group comprising blast furnace slag, puzzolane, burnt shale, fly ash, limestone and silica fume or mixtures thereof. The maximum amount of silica fume in CEM II is by definition 10% by weight of the cement. In particular, CEM I is preferably contained in the composition of the invention.

The amount of Portland cement in the composition of the invention of the invention is from 10 to 60% based on the weight of the total composition, preferably from 15 to 55% based on the weight of the total composition, more preferably from 20 to 50%, in particular from 25 to 45%.

The composition of the invention may contain small amounts of a fast-hardening cement. Fast hardening cements comprise aluminate cements, such as calcium aluminate cement or calcium sulpho aluminate cement. The fast-hardening cement may be contained in the composition of the invention in an amount of preferably less than 10% by weight, based on the amount of Portland cement, more preferably less than 5%, in particular less than 1%. In a particularly preferred embodiment, the composition is free of fast-hardening cement.

At least one cellulose ether employed as a water retention agent is part of the composition of the invention, preferably with an average molecular weight $M_w$ higher than 500,000 g/mol, more preferably higher than 1,000,000 g/mol. The term water retention agent means an agent, which keeps the water content of a cementitious composition within appropriate limits, without depleting or enriching the water content.

Preferred water retention agents are alkylcelluloses such as methylcellulose, ethylcellulose, propylcellulose and methylethylcellulose, hydroxylalkylcelluloses such as hydroxyethylcellulose (HEC), hydroxypropylcellulose (HPC) and hydroxyethylhydroxypropylcellulose, alkylhydroxyalkylcelluloses such as methylhydroxyethylcellulose (MHEC), methylhydroxypropylcelluose (MHPC) and propylhydroxypropylcellulose. Preference is given to the cellulose ether derivatives methylcellulose (MC), hydroxypropylcellulose (HPC), hydroxyl-ethylcellulose (HEC) and ethylhydroxyethylcellulose (EHEC), and particular preference is given to methylhydroxyethylcelluose (MHEC), methylhydroxy-propyl-celluose (MHPC) and carboxymethylcellulose (CMC). Particular preference is given to the use of carboxymethyl cellulose, methyl cellulose and/or hydroxypropyl methyl cellulose. The preferred dosage of cellulose ether in the composition of the invention is 0.05 to 2.0% by weight of the total composition, more preferably 0.1 to 1%, most preferably 0.1 to 0.5%, for example about 0.3%.

Further, the cellulose ether is preferably not used in combination with starch ethers or polyacrylamides according to the composition of the invention.

Further, a latex powder with a molecular weight $M_w$ of at least 500,000 g/mol, preferably of at least 1,000,000, is part of the composition of the invention.

The term latex powder refers to (co)polymers which can be obtained as a water-based dispersion by appropriate polymerization processes such as emulsion polymerization processes and are converted into a polymer powder in a further step by suitable drying measures such as spray drying. The latex powder is in general redispersable, i.e. when mixed into water or aqueous systems, the latex powder again forms a water-based dispersion. Latex powders are known to act essentially as organic binders in the building material mixture which has been made up with water, with this effect being based mainly on formation of a polymer film from the primary particles as a result of evaporation of water. According to the composition of the invention, the latex powders should have at most a slightly retarding effect for the setting time of the composition.

Suitable latex powders are (co)polymers including those based on one or more ethylenically unsaturated monomers which can be selected from among one or more of the following monomer groups: vinylaromatics, vinyl esters of branched or linear alkylcarboxylic acids containing from 1 to 15 carbon atoms, dienes, (meth)acrylic esters of branched or linear alcohols containing from 1 to 10 carbon atoms, vinyl halides and olefins. The monomers should preferably have a hydrophobic character.

The latex powder may preferably be selected from the group consisting of vinyl acetate polymer, vinyl acetate-ethylene copolymer, vinyl acetate-vinyl ester copolymer and/or vinyl acetate-vinyl ester-ethylene copolymer, with the vinyl ester monomers in each case being selected from the group consisting of vinyl laurate, vinyl pivalate and vinyl versatates, vinyl acetate-acrylic ester copolymer, vinyl acetate-acrylic ester-ethylene copolymer, styrene-butadiene copolymer and styrene-acrylic ester copolymer, with the acrylic esters in each case being esters with branched or linear alcohols containing from 1 to 10 carbon atoms.

Examples of preferred monomers within the group of vinylaromatics are styrene, vinyltoluene and α-methylstyrene. As preferred vinyl esters of branched or linear alkylcarboxylic acids containing from 1 to 15 carbon atoms, vinyl acetate, vinyl propionate, vinyl butyrate, vinyl 2-ethylhexanoate, 1-methylvinyl acetate, vinyl laurate and vinyl esters of monocarboxylic acids which have a tertiary carbon atom in the α position relative to the acid group and have from 5 to 11 carbon atoms (vinyl versatates), for example VeoVa5® (vinyl pivalate), VeoVa9®, VeoVa10® and VeoVa11® (trade names of Shell), may be mentioned. Preferred dienes are 1,3-butadiene and isoprene, preferred (meth)acrylic esters of branched or linear alcohols containing from 1 to 10 carbon atoms are methyl (meth)acrylate, ethyl (meth)acrylate, propyl (meth)acrylate, n-butyl (meth)acrylate, and 2-ethylhexyl acrylate.

Preferred olefins are ethylene, propylene, 1-butene and 2-methylpropene, particularly preferably ethylene. Preferred vinyl halide monomers are vinyl chloride and vinylidene chloride. As (co)polymers suitable as redispersible polymer powders, preference is given to the following types:

From the group of polymers of vinyl alkylcarboxylates, preference is given to vinyl acetate-ethylene, vinyl acetate copolymers, vinyl ester-ethylene-vinyl chloride copolymers, and vinyl acetate-acrylic ester copolymers.

Among the group of (meth)acrylic ester polymers, preference is given to copolymers composed of the monomer units n-butyl acrylate and/or 2-ethylhexyl acrylate, copolymers of methyl methacrylate with n-butyl acrylate and/or 2-ethylhexyl acrylate and copolymers of methyl methacrylate with 1,3-butadiene.

Among the group of vinyl halide copolymers, preference is given to vinyl ester-ethylene-vinyl chloride copolymers, vinyl chloride-ethylene copolymers and vinyl chloride-acrylate copolymers.

Among the group of vinylaromatic copolymers, preference is given to styrene-butadiene copolymers and styrene-acrylic ester copolymers such as styrene-n-butyl acrylate or styrene-2-ethylhexyl acrylate.

The latex powder is particularly present as vinyl acetate polymer, vinyl acetate-ethylene copolymer, vinyl acetate-vinyl ester copolymer and/or vinyl acetate-vinyl ester-ethylene copolymer, with the vinyl ester monomers being selected in each case from the group consisting of vinyl laurate, vinyl pivalate and vinyl versatates, also as vinyl acetate-acrylic ester copolymer, vinyl acetate-acrylic ester-ethylene copolymer, styrene-butadiene copolymer and styrene-acrylic ester copolymer, with the acrylic esters in each case being esters of branched or linear alcohols containing from 1 to 10 carbon atoms.

If appropriate, the (co)polymers can additionally contain functional comonomer units in an amount of from 0.1 to 10% by weight, based on the total weight of the polymer. These functional copolymer units can be selected from the group comprising monocarboxylic or dicarboxylic acids, for example (meth)acrylic acid and/or maleic acid, ethylenically unsaturated carboxamides such as (meth)acrylamide, ethylenically unsaturated sulphonic acids and salts thereof, for example vinylsulphonic acid and/or styrenesulphonic acid, multiply ethylenically unsaturated comonomers, for example divinyl adipate, triallyl isocyanurate, diallyl maleate and/or allyl methacrylate.

The (co)polymerization is carried out by processes well known in the industry, e.g. the emulsion polymerization process. The dispersions obtained can be stabilized either by means of an emulsifier or by means of a protective colloid such as polyvinyl alcohol. To obtain the redispersible polymer powders, drying is carried out, usually by conventional processes such as spray drying, freeze drying, coagulation of the dispersion and subsequent fluidized-bed drying. The preferred process is spray drying. The latex powder is preferably present in the composition in an amount of 0.5 to 10 weight %, preferably 0.5 to 6 weight %, more preferably 1 to 5%. for example 3 weight %, with respect to the total weight of the composition.

Calcium-silicate-hydrate is part of the composition of the invention and has an accelerating effect for the setting time of the composition of the invention. Furthermore calcium-silicate-hydrate increases the early strength of the composition of the invention between 3 to 16 hours compared to a composition without calcium-silicate-hydrate. Calcium-silicate-hydrate may contain foreign ions, such as magnesium and aluminium. Calcium-silicate-hydrate can be described with regard to its composition by the following empirical formula:

$a\text{CaO}, \text{SiO}_2, b\text{Al}_2\text{O}_3, c\text{H}_2\text{O}, d\text{X}, e\text{W}$ X is an alkali metal
W is an alkaline earth metal

| | | |
|---|---|---|
| $0.1 \leq a \leq 2$ | preferably | $0.66 \leq a \leq 1.8$ |
| $0 \leq b \leq 1$ | preferably | $0 \leq b \leq 0.1$ |
| $1 \leq c \leq 6$ | preferably | $1 \leq c \leq 6.0$ |
| $0 \leq d \leq 1$ | preferably | $0 \leq d \leq 0.4$ or $0.2$ |
| $0 \leq e \leq 2$ | preferably | $0 \leq e \leq 0.1$ |

Calcium-silicate-hydrate is preferably obtained by the reaction of a water-soluble calcium compound with a water-soluble silicate compound in presence of a water-soluble dispersant, preferably in presence of a polycarboxylate ether (PCE). The calcium-silicate-hydrate and its preparation are for example described in WO 2010/026155 A1.

Typically calcium-silicate-hydrate is present in the composition in the form of foshagite, hillebrandite, xonotlite, nekoite, clinotobermorite, 9 Å-tobermorite (riversiderite), 11 Å-tobermorite, 14 Å-tobermorite (plombierite), jennite, metajennite, calcium chondrodite, afwillite, α-C₂SH, dellaite, jaffeite, rosenhahnite, killalaite and/or suolunite. More preferably calcium-silicate-hydrate is present in the composition in the form of xonotlite, 9 Å-tobermorite (riversiderite), 11 Å-tobermorite, 14 Å-tobermorite (plombierite), jennite, metajennite, afwillite and/or jaffeite.

In a preferred embodiment the molar ratio of calcium to silicon in the calcium-silicate-hydrate in the composition, preferably aqueous setting accelerator suspension, is from 0.6 to 2, preferably 0.8 to 1.8, most preferably 0.9 to 1.5. In a further preferred embodiment the molar ratio of calcium to water in the calcium-silicate-hydrate is from 0.6 to 6, preferably 0.6 to 2, more preferably 0.8 to 2.

Preferred is a construction chemical composition, wherein calcium-silicate-hydrate is present as a powder product. Powder products are advantageous, as they provide high contents of calcium-silicate-hydrate. In particular no compatibility problems with for example cement or other hydraulic binders appear.

One embodiment is a construction chemical composition, wherein the particle size $d_{50}$ of the hardening accelerator is smaller than 100 μm, preferably smaller than 50 μm, more preferably smaller than 30 μm, the particle size being measured by light scattering with a MasterSizer® 2000 from the company Malvern. Small size particles of calcium-silicate-hydrate are especially effective as hardening accelerators. In general the particle size of the powder is in the range from 500 nm to 100 μm, preferably 600 nm to 50 μm, in particular 800 to 30 μm.

Any calcium-silicate-hydrate (CSH) that acts as a hardening accelerator may be used in the construction chemical compositions. Suitable CSHs are low-density CSH according to WO 02/070425 A1, CSH gel according to WO 93/22252, CSH according to WO 95/04007, CSH seeds according to WO 2011/131904 A1, CSH obtainable according to WO 2012/025567 A1, CSH seeds according to WO 2012/085508 A1, CSH according to WO 2012/160319 A1, CSH powder according to WO 2013/017391 A1, CSH obtainable according to WO 2013/083627 A1, CSH obtainable according to WO 2013/093034 A1, CSH according WO 2013/150145 A1, CSH seeds according to WO 2014/016209 A1, CSH according to WO 2014/053699 A1 and CSH obtainable according to WO2010/026155, WO2011/029711, WO2011/026720, WO2011/026723, WO2011/104347, WO2012/072466, WO2012/143206, WO2012/143205, WO2014/026938, WO2013/178417, WO2013/178560, WO2014/114782 or WO2014/114784 or mixtures of said CSHs.

Further preferred is a construction chemical composition, wherein calcium-silicate-hydrate was obtained in the form of a suspension by a process a) by a reaction of a water-soluble calcium compound with a water-soluble silicate compound, the reaction of the water-soluble calcium compound with the water-soluble silicate compound being carried out in the presence of an aqueous solution which contains at least one polymeric dispersant, which contains anionic and/or anionogenic groups and polyether side chains, preferably poly alkylene glycol side chains, or was obtained in the form of a suspension by a process β) by reaction of a calcium compound, preferably a calcium salt, most preferably a water-soluble calcium salt, with a silicon dioxide containing component under alkaline conditions, wherein the reaction is carried out in the presence of an aqueous solution of at least one polymeric dispersant, which contains anionic and/or anionogenic groups and polyether side chains, preferably polyalkylene glycol side chains. To obtain the calcium-silicate-hydrate as a powder product, the suspension obtained from said processes α) or β) is dried in a further step in a conventional manner, for example by spray drying.

Examples for the processes α and β) are given in the international patent application published as WO 2010/026155 A1.

In a preferred embodiment the water-soluble dispersant used for the preparation of calcium silicate hydrate comprises at least one polymer, which comprises structural units containing anionic and/or anionogenic groups and structural units containing polyether side chains. More particularly it is possible to use polymers containing relatively long side chains (with a molecular weight of in each case at least 200 g/mol, more preferably at least 400 g/mol) in varying distances on the main chain. Lengths of these side chains are often identical, but may also differ greatly from one another (for instance, in the case polyether macromonomers containing side chains of different lengths are copolymerized). Polymers of these kinds are obtainable, for example, by radical polymerization of acid monomers and polyether macromonomers. An alternative route to comb polymers of this kind is the esterification and/or amidation of poly(meth) acrylic acid and similar (co)polymers, such as acrylic acid/ maleic acid copolymers, for example, with suitable monohydroxy-functional or monoamino-functional polyalkylene glycols, respectively, preferably alkyl polyethylene glycols. Comb polymers obtainable by esterification and/or amidation of poly(meth)acrylic acid are described for example in EP 1138697B1.

The average molecular weight $M_w$ of said polymers as determined by gel permeation chromatography (GPC) is 5,000 to 200,000 g/mol, preferably 10,000 to 80,000 g/mol, in particular 20,000 to 70,000 g/mol. The average molecular weight of the polymers was analyzed by means of GPC (column combinations: OH-Pak SB-G, OH-Pak SB 804 HQ and OH-Pak SB 802.5 HQ from Shodex, Japan; eluent: 80 vol % aqueous solution of $HCO_2NH_4$ (0.05 mol/l) and vol % acetonitrile; injection volume 100 μl; flow rate 0.5 ml/min). Calibration for the purpose of determining the average molar mass was carried out with linear poly(ethylene oxide) standards and polyethylene glycol standards.

The polymeric dispersant preferably meets the requirements of industrial standard EN 934-2 (February 2002).

In a preferred embodiment the construction chemical composition of the invention contains as the hardening accelerator a combination of calcium-silicate-hydrate and at least one calcium salt having a solubility in water of at least 1 g in 1 liter of water at 23° C. Preference is given to calcium salts selected from the group comprising calcium chloride, calcium nitrate, calcium formate, calcium acetate, calcium bicarbonate, calcium bromide, calcium citrate, calcium chlorate, calcium gluconate, calcium hydroxide, calcium oxide, calcium hypochlorite, calcium iodate, calcium iodide, calcium lactate, calcium nitrite, calcium propionate, calcium sulfate, calcium sulfate hemihydrate, calcium sulfate dihydrate, and mixtures of two or more of these components, in particular calcium nitrate, calcium acetate, calcium chloride, calcium hydroxide or calcium formate, or a mixture thereof.

The amount of hardening accelerator in the composition of the invention is from 0.2 to 3% by weight of the total composition, preferably 0.5 to 2.5%. The amount of calcium silicate hydrate is preferably 0.1 to 1.2% by weight of the total composition and the amount of calcium salt having a solubility in water of ≥1 g/l at 23° C. is preferably 0.1 to 4% by weight of the total composition, more preferably 0.5 to 2.5%. The weight ratio of calcium silicate hydrate to calcium salt having a solubility in water of ≥1 g/l at 23° C. is in the range from 3:1 to 1:3.

Preferred is a construction chemical composition, wherein the hardening accelerator provides an acceleration factor of higher than 1.5, preferably higher than 2.0, in particular higher than 2.5. For the determination of the acceleration factor (AF) two dry mortar compositions, one containing an amount of 2% by weight, based on the amount of Portland cement, of the hardening accelerator and the other one without the accelerator, were prepared. The dry compositions were then mixed with water (water/cement ratio=0.4). The resulting cement pastes were then independently placed into an isothermal heat flow calorimeter (e.g. Tam Air by TA Instruments) at 20° C. The heat flows of both samples were recorded. The heat of hydration (HoH) was then calculated according to equation 1:

$HoH = \int_{t_{begin}}^{t_{end}}$ Heat Flow $dt$, wherein $t_{begin}$=1800 s and $t_{end}$=21600 s     Equation 1:

The acceleration factor (AF) was calculated according to equation 2:

$AF = HoH_{acc}/HoH_{ref}$     Equation 2:

In a preferred embodiment of the composition of the invention at least one additional rheology modifier, preferably selected from water-swellable polymers or mineral thickeners, is contained. Additional rheology modifiers are particularly necessary, when the construction chemical composition of the invention is used as cementitious tile adhesive for wall applications. Without the addition of an additional rheology modifier, the construction chemical composition is preferably used as tile adhesive for floor application.

Preference is given to compositions in which the water-swellable polymer is selected from the group comprising a) anionic crosslinked polyelectrolytes, β) cationic crosslinked polyelectrolytes, γ) ampholytic crosslinked polyelectrolytes and δ) nonionic crosslinked polymers, preferably nonionic crosslinked polymers from free-radical polymerization.

The term "crosslinked" means that at least one crosslinker group is present in the particular water-swellable polymers, which leads to the formation of a covalent bond between at least two polymer constituents different from the crosslinker group. The configuration of the bond formed between the polymer constituents by the crosslinker group is preferably one, providing a branch at the bond formation points. The term "crosslinked" more preferably means that more than one crosslinker group is present in the particular water-swellable polymers, which lead to the formation of a plurality of covalent bonds between polymer constituents different from the crosslinker group.

Especially preferred are crosslinking structural units, which are derived from monomers, which have polyethylenically unsaturated vinyl groups. These can be converted, for example, with free-radically polymerizable monomers having only one ethylenically unsaturated vinyl group in a free-radical (co)polymerization to yield the particular water-swellable polymers.

The alternative α), the anionic crosslinked polyelectrolytes, comprises polymers which comprise, as anionic groups, preferably sulphonates, sulphates, phosphates and/or phosphites. Sulphonates are particularly preferred as the anionic group. Less preferred are polymers having a very high proportion of carboxylate groups. Carbonates are less preferred, because they cannot develop strong water absorption and efficacy as superabsorbents in aqueous systems with a high ion content, especially a high calcium content. The proportion of carboxylate groups based on the total amount of all anionic groups is preferably less than 40 mol %.

The alternative β), the cationic crosslinked polyelectrolytes, comprises polymers which have preferably quaternary ammonium salts as cationic groups.

The alternative γ), of ampholytic crosslinked polyelectrolytes, comprises polymers, which contain both anionic groups, preferably the anionic groups mentioned above (see α)), and cationic groups, preferably the cationic groups mentioned above (see β). The ratio of the number of anionic to cationic groups is preferably between 95:5 and 5:95, more preferably between 80:20 and 20:80.

Preferably, the α) anionic crosslinked polyelectrolytes, β) cationic crosslinked polyelectrolytes and γ) ampholytic crosslinked polyelectrolytes are obtained by free-radical polymerization. The alternative δ), nonionic crosslinked polymers, comprises nonionic polymers. These polymers are preferably hydrophilic, in order to achieve sufficient water absorption capacity in spite of the absence of charges. The nonionic crosslinked polymers are preferably obtained by free-radical polymerization.

The sulpho group-containing structural unit according to general formula (VI) as shown in embodiment 55 preferably originates from the copolymerization of one or more of the monomer species 2-acrylamido-2-methylpropanesulphonic acid, 2-methacrylamido-2-methylpropanesulphonic acid, 2-acrylamidobutanesulphonic acid and/or 2-acrylamido-2,4,4-trimethylpentanesulphonic acid, or the salts of each of the acids mentioned. Particular preference is given to 2-acrylamido-2-methylpropanesulphonic acid and the salt compounds thereof. The cations which form part of the salt compounds of the acids may be present as mono- or divalent metal cations, such as preferably sodium, potassium, calcium or magnesium ions, or as ammonium ions which derive from ammonia, primary, secondary or tertiary $C_1$-$C_{20}$-alkylamines, $C_1$-$C_{20}$-alkanolamines, $C_5$-$C_8$-cycloalkylamines and $C_6$-$C_{14}$-arylamines. The alkyl radicals may be branched or unbranched. Examples of corresponding amines are methylamine, dimethylamine, trimethylamine, ethanolamine, diethanolamine, triethanolamine, cyclohexylamine, dicyclohexylamine, phenylamine and diphenylamine. Preferred cations are alkali metal ions and/or ammonium ions, particular preference is given to the sodium ion.

A further anionic monomer component suitable for the preparation of α) anionic crosslinked polyelectrolytes and γ) ampholytic crosslinked polyelectrolytes, may additionally be ethylenically unsaturated, water-soluble carboxylic acids and/or carboxylic anhydrides, preferably contained in an amount of less than 40 mol %, more preferably less than 25 mol %, based on the total number of moles of all monomers in the water-swellable polymer. The ethylenically unsaturated carboxylic acids may, for example, be acrylic acid, methacrylic acid, ethacrylic acid, α-chloroacrylic acid, α-cyanoacrylic acid, β-methacrylic acid (crotonic acid), α-phenylacrylic acid, α-cyanoacrylic acid, sorbic acid, α-chlorosorbic acid, 2'-methylisocrotonic acid, cinnamic acid, p-chlorocinnamic acid, β-stearylacrylic acid, maleic acid, itaconic acid, citraconic acid, mesaconic acid, glutaconic acid, aconitic acid, maleic acid, fumaric acid and/or tricarboxyethylene. The carboxylic anhydride used may be maleic anhydride. The aforementioned further anionic monomer components may also be present as the anionic component in γ) ampholytic crosslinked polyelectrolytes, preferably in an amount of less than 40 mol %, more preferably less than 25 mol %, based on the total number of moles of all monomers in the water-swellable polymer.

In the cationic water-swellable polyelectrolytes, the structural unit which has a quaternized nitrogen atom and corresponds to general formula (VII) as shown in embodiment 56 preferably originates from the polymerization of one or more monomer species selected from the group of [2-(acryloyloxy)ethyl]trimethylammonium salts, [2-(methacryloyloxy)ethyl]-trimethylammonium salts, [3-(acryloylamino)propyl]trimethylammonium salts and/or [3-(methacryloylamino)propyl]-trimethylammonium salts.

Preferably sulpho-containing structural units of general formula (VI) and cationic structural units, which have a quaternized nitrogen atom and are of general formula (VII), are present in the γ) ampholytic crosslinked polyelectrolytes. The anionic monomers of formula (VI) are present in the γ) ampholytic crosslinked polyelectrolytes preferably in an amount of 5 to 95 mol %, and the cationic monomers of the formula (VII) preferably in an amount of 5 to 95 mol %. The sum of the cationic and anionic polymers is preferably 5 mol % to 99.99 mol %, more preferably 20 mol % to 80 mol %. The above values in mol % are each based on the sum of all structural units obtainable by free-radical polymerization, in other words on the sum of all monomers in the particular polymers.

The structural units (VIII) as shown in embodiment 58 originate from the copolymerization of one or more of the monomer species acrylamide, methacrylamide, N-methyl (meth)acrylamide, N,N-dimethylacrylamide, N-ethylacrylamide, N,N-diethylacrylamide, N-cyclohexylacrylamide, N-benzylacrylamide, N,N-dimethylaminopropylacrylamide, N,N-dimethylaminoethylacrylamide and/or N-tert-butylacrylamide. Preference is given to methylacrylamide, N,N-dimethylacrylamide and methacrylamide, particular preference to acrylamide. In the anionic, in the cationic and in the ampholytic crosslinked polyelectrolytes, the (meth)acrylamido-containing structural units of formula (VIII) are present preferably from 30 to 94 mol %, preferably from 40 to 80 mol % and most preferably from 50 to 70 mol %, based in each case on the total number of all structural units obtainable by free-radical polymerization.

In a further preferred embodiment, the δ) nonionic crosslinked polymers, which can form a hydrogel, contain (meth) acrylamido-containing structural units of general formula (VIII). The structural units (VIII) preferably originate from the copolymerization of one or more of acrylamido-containing monomer species. Preference is given again to (meth) acrylamide and N,N-dimethyl(meth)acrylamide, particular preference to acrylamide. The structural units of formula (VIII) are present preferably in an amount of 50 to 99.99 mol %, based in each case on the total number of all structural units obtainable by free-radical polymerization.

The cationic polymer preferably comprises
a) structural units according to general formula (XI),

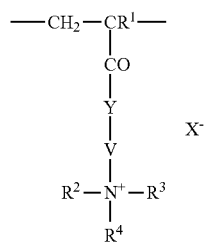

wherein
$R^1$ is hydrogen or methyl,
$R^2$ and $R^3$ are in each case identical or different and independently of one another hydrogen, an aliphatic hydrocarbon radical containing 1 to 20 C atoms (branched or linear, preferably methyl or ethyl radical), a cycloaliphatic hydrocarbon radical containing 5 to 8 C atoms (more particular cyclohexyl radical) and/or an aryl radical containing 6 to 14 C atoms (more particularly a phenyl radical),
$R^4$ is a substituent identical to $R^2$ or $R^3$ or —$(CH_2)_x$—$SO_3Mk$, -Cyclohexyl-$SO_3M_k$ or -Phenyl-$SO_3M_k$,
M is in each case identical or different and is a monovalent or divalent metal cation, ammonium cation ($NH_4$) and/or quaternary ammonium cation $(NR_1R_2R_3R_4)^+$,
k is ½ and/or 1,
Y is oxygen, —NH or —$NR^2$,
V is —$(CH_2)x$-, -Cyclohexyl- or -Phenyl-,
x is an integer from 1 to 6 (preferably 1 or 2)
$X^-$ is a halide (preferably Cl or Br), $C_1$- to $C_4$-alkylsulphate (preferably methylsulphate) and/or $C_1$- to $C_4$-alkylsulphonate (preferably methylsulphonate), and/or
b) structural units according to general formula (XII),

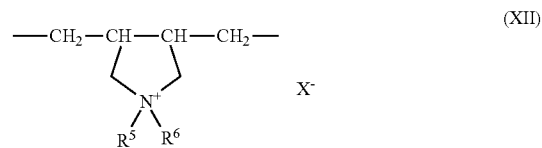

wherein
$R^5$, $R^6$=hydrogen, an aliphatic hydrocarbon radical containing 1 to 6 C atoms, a phenyl radical, optionally substituted by methyl groups, and
$X^-$ is a halide (preferably Cl or Br), $C_1$- to $C_4$-alkylsulphate (preferably methylsulphate) and/or $C_1$- to $C_4$-alkylsulphonate (preferably methylsulphonate),
with the proviso that the sum of the cationic structural units according to general formula (XI) and/or the general formula (XII) is at least 5 mol %, based on all structural units.

The (co)polymers in question are preferably obtainable by a radical (co)polymerization of corresponding unsaturated cationic monomers. The molecular weight $M_w$ of the (co) polymers thus prepared is typically more than 100 000 g/mol, more preferably more than 300 000 g/mol. The structural unit α) originates preferably from the polymerization of one or more of the monomer species [2-(acryloyloxy)ethyl]trimethylammonium chloride, [2-(acryloylamino)ethyl]trimethylammonium chloride, [2-(acryloyloxy)ethyl]trimethylammonium methosulphate, [2-(methacryloyloxy)ethyl]trimethylammonium chloride and/or methosulphate, [3-(acryloylamino)propyl]trimethylammonium chloride, [3-(methacryloylamino)propyl]trimethylammonium chloride, N-(3-sulphopropyl)-N-methacryloyloxyethyl-N',N-dimethylammonium betaine, N-(3-sulphopropyl)-N-methacrylamidopropyl-N,N-dimethylammonium betaine and/or 1-(3-sulphopropyl)-2-vinylpyridinium betaine. Preference is given to [2-(acryloyloxy)ethyl]trimethylammonium chloride, [2-(acryloylamino)ethyl]trimethylammonium chloride, [2-(methacryloyloxy)ethyl]trimethylammonium chloride, [3-(acryloylamino)propyl]trimethylammonium chloride and [3-(methacryloylamino)propyl]trimethylammonium chloride. Particularly preferred are [2-(methacryloyloxy)ethyl] trimethylammonium chloride, [3-(acryloylamino)propyl] trimethylammonium chloride and [3-(methacryloylamino) propyl]trimethylammonium chloride. The structural unit b) is preferably derived from N,N-dimethyldiallylammonium chloride and/or N,N-diethyldiallylammonium chloride.

The cationic structural units a) and b) are present in the (co)polymer with the proviso that the sum of the cationic structural units according to the general formula (XI) and/or the general formula (XII) is at least 5 mol %, based on all structural units. Anionic structural units c) containing sulpho groups and/or structural units d) containing amido groups may be present in the (co)polymer in the case the (co)polymers are not purely cationic. Particularly preferred are structural units b), containing amido groups. The structural units a) and b) may contribute to 100 mol % of the (co)polymer, which in that case corresponds to a homopolymer. Cationic (co)polymers are especially suitable as a stabilizing additive during the operation of drying accelerator suspensions containing calcium silicate hydrate. Preference is given to solid compositions comprising calcium silicate hydrate and at least one water-soluble cationic (co)polymer, wherein the weight ratio of the (co)polymer to calcium silicate hydrate is from 5:1 to 1:3, preferably from 2:1 to 1:2.

Preferred compositions are those, wherein the water-soluble cationic (co)polymer comprises c) 1 to 95 mol % of anionic, sulpho-group-containing structural units according to general formula (IX) as shown in embodiment 60.

In this preferred embodiment, in addition to the minimum fraction of 5 mol % of cationic structural units of the general structural formulae a) and/or b), also 1 up to a maximum of 95 mol % of anionic, sulpho-group-containing structural units c) are present in the (co)polymer. The (co)polymers in question are in this case ampholytic (co)polymers having both, anionic and cationic structural units. The structural unit c) is preferably derived from monomers such as 2-acrylamido-2-methylpropanesulphonic acid, 2-methacrylamido-2-methylpropanesulphonic acid, 2-acrylamidobutanesulphonic acid, 3-acrylamido-3-methylbutanesulphonic acid and/or 2-acrylamido-2,4,4-trimethylpentanesulphonic acid. Particularly preferred is 2-acrylamido-2-methylpropanesulphonic acid (ATBS).

Preferred compositions are those, wherein the cationic (co)polymer comprises d) 10 to 95 mol % of amido-group-containing structural units according to general formulae (Xa) and/or (Xb) as shown in embodiment 61.

In general the structural unit d) originates from the polymerization of one or more of the monomer species acrylamide, methacrylamide, N-methylacrylamide, N,N-dimethylacrylamide, N-ethylacrylamide, N-cyclohexylacrylamide, N-benzylacrylamide, N-methylolacrylamide, N-tert-butylacrylamide, etc. Examples of monomers as a basis for structure (IVb) are N-methyl-N-vinylformamide, N-methyl-N-vinylacetamide, N-vinylpyrrolidone, N-vinylcaprolactam and/or N-vinylpyrrolidone-5-carboxylic acid. Preferred are acrylamide, methacrylamide and/or N,N-dimethylacrylamide.

Preferred compositions are those, wherein 1 to 86 mol % of anionic, sulpho-group-containing structural units according to general formula (IX) and 9 to 94 mol % of amido-group-containing structural units according to general formulae (Xa) and/or (Xb) are present in the (co)polymer.

Mineral thickeners preferably comprise clay, bentonite, sheet silicates, preferably alumosilicates and/or highly porous calcium-silicate-hydrate. The calcium-silicate-hydrate in these cases has an acceleration factor <1.5 hence is not a hardening accelerator in the sense of this invention.

The amount of additional rheology modifiers is preferably from 0.01 to 3% by weight of the total composition, in particular from 0.1 to 1%, for example about 0.3%.

Particularly preferred is a construction chemical composition with an amount of anionic starch ethers of less than 0.5% by weight of the total composition, in particular less than 0.1%, for example 0%, meaning no anionic starch ether is contained in the composition.

Further, the invention concerns a mortar composition containing the construction chemical composition of above-mentioned embodiments. Besides the essential constituents of the mortar composition, Portland cement, at least one cellulose ether, at least one latex powder, calcium silicate hydrate and optionally an accelerator selected from defined calcium salts, additional ingredients may be added in order to generate said mortar composition. Examples for additional ingredients are water and fillers like limestone powder, fly ash, blast furnace slag, sand or pozzolane. Preferably limestone powder, water and/or sand or mixtures thereof are admixed to the construction chemical composition of the invention to generate above-mentioned mortar composition.

The compositions of the invention surprisingly provide a pull-off strength value of at least 0.5 MPa after 6 h and therefore meet the requirements according to DIN EN 12004. Mortar compositions leading to pull-off strength values according to DIN EN 12004 are generally suited for use as fast setting cementitious tile adhesives and grout mortar for floor and/or wall applications.

The following examples illustrate the invention without limiting it. The composition of the examples is given in tables 1 and 3 whereas pull-off strength values are given in tables 2 and 4. The compositions were prepared by mixing the components in a conventional mixing device and adding water in the indicated amounts.

TABLE 1

| | Example 1 (comparative) | Example 2 (invention) | Example 3 (comparative) | Example 4 (comparative) | Example 5 (comparative) | Example 6 (invention) |
|---|---|---|---|---|---|---|
| Portland-cement[1)] | 38% | 38% | 38% | 38% | 38% | 38% |
| Calcium aluminate cement[2)] | 7% | | | | 7% | |
| Limestone powder[3)] | 6% | 6% | 6% | 6% | 6% | 6% |
| Sand[4)] | 45.3% | 50.4% | 51.9% | 51.2% | 45.18% | 50.1% |
| Cellulose ether[5)] | 0.3% | 0.3% | 0.3% | 0.3% | 0.3% | 0.3% |
| Latex powder[6)] | 3% | 3% | 3% | 3% | 3% | 3% |
| CSH-powder | | 0.8% | 0.8% | | | 0.8% |
| Calcium formate | | 1.5% | | 1.5% | | 1.5% |
| Lithium carbonate | 0.1% | | | | 0.1% | |

TABLE 1-continued

|  | Example 1 (comparative) | Example 2 (invention) | Example 3 (comparative) | Example 4 (comparative) | Example 5 (comparative) | Example 6 (invention) |
|---|---|---|---|---|---|---|
| Tri-sodium citrate | 0.2% |  |  |  | 0.2% |  |
| Sodium gluconate | 0.1% |  |  |  | 0.1% |  |
| Starch ether[7] |  |  |  |  | 0.1% |  |
| Polyacryl amide[8] |  |  |  |  | 0.02% |  |
| Water swellable polymer[9] |  |  |  |  |  | 0.3% |
| Water (by weight of dry mortar) | 23% | 26.5% | 26% | 26% | 26% | 25% |

[1] CEM I 52.5 R Milke ® purchased from HeidelbergCement AG, Ennigerloh
[2] CEMFAST 52.5
[3] Omyacarb 5 AL
[4] Strobel BCS 221 HS 5 sand
[5] Samsung PMC 30 US
[6] Vinnapas 5028 E
[7] Starvis ® SE 35F
[8] Starvis ® T 50F
[9] Starvis ® S 3911 F
All amounts are in % by weight, based on the amount of the total composition. Water is given in % by weight based on the total weight of dry mortar.

The hardening accelerator comprising calcium-silicate-hydrate (written as CSH-powder in table 1) was prepared according to WO2014/114784.

Examples 1 to 4 are mixtures for cementitious tile adhesives for floor applications, examples 5 and 6 are for wall applications. In order to ascertain the suitability of the mixtures for their intended application pull-off strength values according to DIN EN 1348 were determined. The results are given in table 2.

Examples 2, and 6 of the invention do meet the requirements of DIN EN 12004 and offer appropriate applicability for use as fast setting tile mortar compositions for floor or wall applications.

Additional examples are provided in table 3 below. Example 8 is a mixture for cementitious tile adhesives for floor application, whereas examples 7 and 9 to 13 are for wall applications.

In order to ascertain the suitability of the mixtures for their intended application pull-off strength values according to DIN EN 1348 were determined. The results are given in table 4. The examples of the invention do neither require a fast setting cement nor other components that are necessary if a fast setting cement is used and yet meet the requirements of DIN EN 12004. The compositions of the invention are therefore suitable for use as fast setting tile mortar compositions for floor or wall applications.

TABLE 2

| Pull off strength values acc. to DIN EN 1348 | | | | | | |
|---|---|---|---|---|---|---|
|  | Example 1 (comparative) | Example 2 (invention) | Example 3 (comparative) | Example 4 (comparative) | Example 5 (comparative) | Example 6 (invention) |
| 6 hours | 0.70 | 0.90 | 0.30 | 0.40 | 0.50 | 0.50 |
| 28 days | 2.40 | 2.70 | 2.60 | 2.50 | 1.70 | 2.00 |
| 10 min open time | 2.10 | 2.50 | 2.40 | 2.20 | 1.50 | 1.40 |
| 20 min open time | 1.90 | 2.10 | 1.60 | 1.50 | 0.90 | 0.40 |
| 30 min open time | 0.20 | 0.30 | 0.60 | 0.50 | 0.00 | 0.00 |
| Heat storage | 2.00 | 2.50 | 2.30 | 2.50 | 1.40 | 2.00 |
| Wet immersion | 1.60 | 1.30 | 0.50 | 1.85 | 0.90 | 0.80 |
| Freeze-thaw | 1.30 | 1.20 | 0.20 | 0.80 | 0.60 | 0.50 |
| Classification according to DIN EN 12004 | C2 F | C2 F | C1 E | C1 E | C1 FT | C1 FT |

Values are given in MPa.

TABLE 3

|  | Example 7 (invention) | Example 8 (invention) | Example 9 (invention) | Example 10 (invention) | Example 11 (comparative) | Example 12 (invention) | Example 13 (comparative) |
|---|---|---|---|---|---|---|---|
| Portland-cement[1] | 35% | 50% | 50% | 25% | 25% | 35% | 35% |

TABLE 3-continued

|  | Example 7 (invention) | Example 8 (invention) | Example 9 (invention) | Example 10 (invention) | Example 11 (comparative) | Example 12 (invention) | Example 13 (comparative) |
| --- | --- | --- | --- | --- | --- | --- | --- |
| Limestone powder[2] | 6% | 6% | 6% | 6% | 6% | 6% | 6% |
| Sand[3] | 55% | 39.75% | 39.75% | 65.90% | 66.90% | 53.50% | 53.20% |
| Cellulose ether[4] | 1% | 0.25% | 0.25% | 0.1% | 0.1% | 0.2% | 0.2% |
| Latex powder[5] | 0.5% | 3% | 3% | 0.5% | 0.5% | 3% | 3% |
| CSH-powder | 1% | 1% | 1% | 1% | 0% | 0.2% | 0% |
| Calcium formate | 1.5% | 0% | 0% | 1.5% | 1.5% | 2% | 2% |
| Starch ether[6] | 0% | 0% | 0% | 0% | 0% | 0.1% | 0.1% |
| Water by weight of dry mortar | 29% | 25% | 20% | 15% | 15% | 18.50 | 17% |

[1] Lafarge BL CEMI 52.5 R (white)
[2] Ulmerweiss Juraperle
[3] Strobel BCS 221HS 5 sand
[4] Ashland Culminal C 4053
[5] Vinnapas 5028 E
[6] Agrana Amitrolit 8869
All amounts are in % by weight, based on the total amount of the dry composition. Water is given in % by weight based on the total weight of dry mortar.

TABLE 4

| Pull off strength values acc. to DIN EN 1348 | | | | | | | |
| --- | --- | --- | --- | --- | --- | --- | --- |
|  | Example 7 (invention) | Example 8 (invention) | Example 9 (invention) | Example 10 (invention) | Example 11 (comparative) | Example 12 (invention) | Example 13 (comparative) |
| 6 hours | 0.55 | 0.60 | 0.55 | 0.60 | 0.25 | 0.6 | 0.40 |
| 28 days | 1.80 | 2.80 | 2.50 | 1.10 | 0.90 | 1.90 | 1.80 |
| 10 min open time | 1.50 | 2.50 | 2.00 | 1.00 | 0.90 | 1.00 | 1.20 |
| 20 min open time | 1.00 | 1.60 | 0.90 | 0.50 | 0.60 | — | 0.60 |
| 30 min open time | 0.50 | 0.60 | — | — | — | — | — |
| Heat storage | 0.80 | 3.00 | 2.80 | 0.80 | 0.70 | 1.80 | 1.80 |
| Wet immersion | 0.70 | 1.40 | 1.20 | 0.70 | 0.60 | 1.10 | 1.20 |
| Freeze-thaw | 0.50 | 1.30 | 1.10 | 0.60 | 0.50 | 1.00 | 1.00 |
| Classification according to DIN EN 12004 | C1 FTE | C2 FE | C2 FT | C1 FT | C1 T | C2 FT | C2 T |

Values are given in MPa.

The invention claimed is:

1. A construction chemical composition comprising
   a) 10 to 60% by weight, based on the total weight of the construction chemical composition, of Portland cement;
   b) 0.01 to 3% by weight, based on the total weight of the construction chemical composition, of a water retention agent selected from at least one cellulose ether;
   c) 0.1 to 10% by weight, based on the total weight of the construction chemical composition, of a redispersable polymer powder selected from at least one latex powder with a molecular weight of at least 500,000 g/mol; and
   d) 0.2 to 3% by weight, based on the total weight of the construction chemical composition, of a hardening accelerator which comprises calcium-silicate-hydrate; and
   e) sand.

2. The construction chemical composition according to claim 1, wherein the hardening accelerator comprises calcium-silicate-hydrate and at least one calcium salt having a solubility in water of ≥1 g/l at 23° C.

3. The construction chemical composition according to claim 2, wherein the calcium salt is selected from calcium nitrate, calcium acetate, calcium chloride, calcium hydroxide or calcium formate, or a mixture of two or more of these salts.

4. The construction chemical composition according to claim 2, wherein the amount of calcium salt is in a range of from 0.1 to 2.5% by weight, based on the total weight of the composition.

5. The construction chemical composition according to claim 1, wherein calcium-silicate-hydrate is obtained by the reaction of a watersoluble calcium compound with a water-soluble silicate compound in presence of a watersoluble dispersant.

6. The construction chemical composition according to claim 1, wherein an aluminate fast-hardening cement, optionally selected from calcium aluminate cement and calcium sulphoaluminate cement, is contained in an amount of less than 10% by weight, based on the amount of Portland cement.

7. The construction chemical composition according to claim 1, comprising anionic starch ether in an amount of less than 0.5% by weight, based on the total weight of the composition.

8. The construction chemical composition according to claim 1, wherein the cellulose ether is selected from the group comprising carboxymethyl cellulose, methyl cellulose, methyl hydroxypropyl cellulose, methyl hydroxyethyl cellulose or mixtures of two or more thereof.

9. The construction chemical composition according claim 1, wherein the latex powder is selected from the group comprising styrene acrylate copolymer, polyvinyl acetate, styrene butadiene copolymer or mixtures of two or more thereof.

10. The construction chemical composition according to claim 1, wherein the amount of cellulose ether is in a range of from 0.05 to 2% by weight, based on the total weight of the composition.

11. The construction chemical composition according to claim 1, wherein the amount of latex powder is in a range of from 0.5 to 10% by weight, based on the total weight of the composition.

12. The construction chemical composition according to claim 1, wherein the amount of the calcium-silicate-hydrate is in a range of from 0.05 to 2% by weight, based on the total weight of the composition.

13. The construction chemical composition according to claim 1, additionally containing at least one rheology modifier.

14. The construction chemical composition according to claim 1, additionally containing at least one cationic polymer.

15. A mortar composition containing the construction chemical composition of claim 1.

16. A method comprising providing the mortar composition according to claim 15 as cementitious tile adhesive or grout mortar for a floor and/or a wall application.

\* \* \* \* \*